United States Patent
Diwane et al.

(10) Patent No.: US 10,172,136 B1
(45) Date of Patent: Jan. 1, 2019

(54) METHOD AND APPARATUS FOR STABILIZING WIRELESS WAN INTERFACE

(71) Applicant: CISCO TECHNOLOGY, INC., San Jose, CA (US)

(72) Inventors: Shivaji Diwane, Pleasanton, CA (US); Keith Neil Mark Dsouza, South San Francisco, CA (US); Rahul Dasgupta, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 160 days.

(21) Appl. No.: 14/843,783

(22) Filed: Sep. 2, 2015

(51) Int. Cl.
*H04W 76/00* (2018.01)
*H04W 72/04* (2009.01)
*H04W 76/38* (2018.01)

(52) U.S. Cl.
CPC ....... *H04W 72/0473* (2013.01); *H04W 76/38* (2018.02)

(58) Field of Classification Search
CPC .................. H04W 76/068; H04W 72/0473
See application file for complete search history.

(56) References Cited

U.S. PATENT DOCUMENTS

| 8,539,268 B2 * | 9/2013 | Lim ............... G06F 1/3209 713/320 |
| 2006/0002321 A1 * | 1/2006 | Han .................. H04B 7/0874 370/312 |
| 2006/0088056 A1 * | 4/2006 | Quigley ............... H04L 41/142 370/468 |
| 2008/0194262 A1 * | 8/2008 | Choi .................. H04W 36/0072 455/437 |
| 2013/0201316 A1 * | 8/2013 | Binder .................. H04L 67/12 348/77 |
| 2016/0219088 A1 * | 7/2016 | Ma ..................... H04L 65/605 |
| 2016/0360489 A1 * | 12/2016 | Boodannavar ....... H04B 7/0413 |

OTHER PUBLICATIONS

Cisco Systems, Inc., "Cisco 819 Machine to Machine Integrated Services Routers," Data Sheet, Mar. 2015, 18 pages.

* cited by examiner

*Primary Examiner* — Shukri Taha
(74) *Attorney, Agent, or Firm* — Patterson + Sheridan, LLP

(57) ABSTRACT

An example method is for controlling a wireless WAN modem configured to attach to a cellular network is disclosed. The method includes determining values of variables indicating a number of attachments of the modem to the cellular network, a received signal strength indication (RSSI) for the modem detecting the cellular network, whether the modem is registered with the cellular network, whether the modem is attached to the cellular network, whether the modem is attached to the cellular network of a predefined technology, and whether the modem is connected via the cellular network to a further network. The method also includes disrupting provision of power to the modem when the values of the variables satisfy a specified set of criteria.

21 Claims, 4 Drawing Sheets

METHOD AND APPARATUS FOR STABILIZING WIRELESS WAN INTERFACE

TECHNICAL FIELD

This disclosure relates in general to the field of communications and, more particularly, to a system and method for stabilizing cellular (e.g. LTE) wireless WAN interface in a network environment.

BACKGROUND

A wireless wide area network (typically referred to as a "wireless WAN" or "WWAN") is a type of wireless networks. Another type of wireless networks is e.g. wireless local area network (typically referred to as a "wireless LAN" or "WLAN"). A WWAN differs from a WLAN in that the former typically uses mobile telecommunication cellular network technologies to transfer data. Such cellular technologies may include technologies specified in 3rd Generation Partnership Project (3GPP), such as e.g. Global System for Mobile Communications (GSM), Universal Mobile Telecommunications System (UMTS), or Long Term Evolution (LTE), or non-3GPP networks, such as e.g. Worldwide Interoperability for Microwave Access (WiMAX). LTE and WiMAX are typically considered to be fourth generation (4G) technologies in that they aim to provide an end-to-end Internet Protocol (IP) connectivity and are characterized by higher speeds and lower latency.

WWAN connectivity, in particular 4G WWAN connectivity, is a relatively recent technology, based on using cellular modems to provide WWAN connectivity over 4G cellular networks. Because the 4G WWAN technology is so recent, such modems have multiple issues which sometimes make the 4G WAN link unstable and completely unusable. Nevertheless, routers, such as e.g. Integrated Service Routers ("ISRs"), integrating cellular modems to provide WWAN connectivity over 4G cellular networks have tremendous demand across the world. One problem with such 4G routers arises from the fact that, up to date, the integrated modems (and cellular technology) implemented in such routers are designed for handset-like use, e.g. for use in a cell phone, while 4G routers are enterprise-class routers which are often deployed in remote locations such as on trains, cargo fleets, or along oil pipelines. On a cell phone, if a modem is unable to connect to the Internet due to a certain issue, the user simply restarts the phone to restore the Internet connection. This problem becomes significantly more severe with 4G routers where the only way to recover from a situation where a modem, and therefore the entire 4G router, has become unstable or unusable is to go to the remote location where the router is deployed and manually reload the router. Such an approach is costly, cumbersome, and complicated, and contributes to the fact that oftentimes 4G WWAN interface cannot be considered as a primary link, but is only considered as a secondary, or backup, link.

What is needed in the art is an approach that could improve on at least some of the issues of WWAN interfaces, in particular 4G WWAN interfaces, described above.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
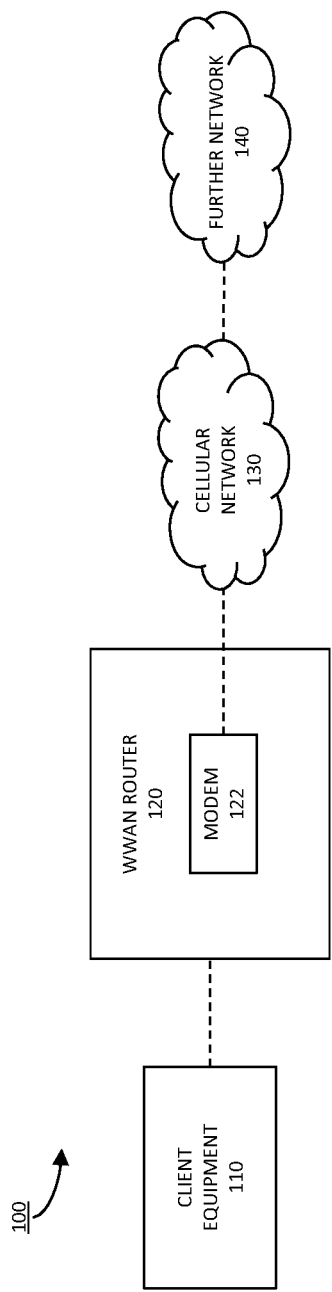
FIG. 1 is a simplified block diagram illustrating an exemplary communication system in a network environment, according to some embodiments of the present disclosure.

One aspect of the present disclosure provides a computer-implemented method for stabilizing cellular wireless WAN interface in a network environment by controlling a WWAN modem, e.g. a modem of a WWAN router, configured to attach to at least one cellular network. In various embodiments, the at least one cellular network could be any 3GPP network, e.g. LTE network.

The proposed method includes steps of determining a value of a first variable (referred to herein as "modem_first_attach") indicating whether the modem has ever attached (or attached within a predetermined time period) to the at least one cellular network, determining a value of a second variable (referred to herein as "modem_rssi") indicating a received signal strength indication (RSSI) for the modem detecting the at least one cellular network, determining a value of a third variable (referred to herein as "emm_state") indicating whether the modem is registered with the at least one cellular network, determining a value of a fourth variable (referred to herein as "ps_state") indicating whether the modem is attached to the at least one cellular network, determining a value of a fifth variable (referred to herein as "system_mode") indicating whether the modem is attached to the at least one cellular network of a predefined technology (e.g. LTE), and determining a value of a sixth variable (referred to herein as "mode") indicating whether the modem is connected via the at least one cellular network to a further network (e.g. Internet) (i.e., determining whether the modem is online). The method also includes a step of automatically (e.g. without human intervention) performing a first remedial action on the modem, the first action including temporarily disrupting provision of power to the modem (i.e. power cycling the modem), when the values of the first, second, third, fourth, fifth, and sixth variables satisfy a first set of one or more criteria.

In an embodiment, the method may further include performing a second action on the modem when the values of the first, second, third, fourth, fifth, and sixth variables satisfy a second set of one or more criteria, the second action comprising resetting the modem, e.g. by a software reset.

In an embodiment, the first or the second action may be performed when the values of the first, second, third, fourth, fifth, and sixth variables satisfy, respectively, the first or the second set of criteria upon determining these values a specified number of times (variable referred to herein as "check_counter", which, in one further embodiment, may be received as e.g. user input).

In an embodiment, the method may further include adjusting the timing of performing the first action based on whether the modem is configured to be a primary WWAN interface, e.g. of the WWAN router (i.e. based on the value of what is referred to herein as "modem_primary_interface" variable).

In an embodiment, the steps of determining the values of the first, second, third, fourth, fifth, and/or sixth variables may be performed in accordance with a timer (referred to herein as "no_downlinkdata_timer"). In one further embodiment, such a timer may be reset when the modem receives data from at least one cellular network.

In some embodiments, the method could be implemented by a functional entity referred to herein as a "WWAN stabilization logic." Various parts of the method could be implemented by e.g. one or more of a WWAN router, a modem of a WWAN router, or an external controller of a WWAN router or its modem, e.g. as an embedded operating system (e.g. IOS) link-stabilizing feature on any of these devices. Therefore, in various embodiments, the WWAN stabilization logic, or part thereof, could be implemented within any of these network elements or/and distributed among a plurality of network elements.

As will be appreciated by one of ordinary skill in the art, aspects of the present disclosure, in particular the functionality related to stabilizing WWAN interface described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded to the existing devices and systems (e.g. to the existing network elements such as the existing modems, routers, and various control nodes) or be stored upon manufacturing of these devices and systems.

EXAMPLE EMBODIMENTS

Exemplary Setting for WWAN Interface Deployment

For purposes of illustrating the techniques for stabilizing WWAN interface in a network environment, it is important to understand the activities that may be present in a typical network environment. The following foundational information may be viewed as a basis from which the present disclosure may be properly explained. Such information is offered for purposes of explanation only and, accordingly, should not be construed in any way to limit the broad scope of the present disclosure and its potential applications.

An exemplary network in which embodiments of the present disclosure can be implemented is illustrated in FIG. 1, providing a simplified block diagram illustrating a communication system 100 in a network environment according to some embodiments of the present disclosure. As shown, the communication system 100 includes client equipment 110 communicative connected to a WWAN router 120. The WWAN router 120 includes a modem 122 that connects the router, and, therefore, the client equipment 110 to a further network 140 such as e.g. Internet, via a cellular network 130.

In various embodiments, the client equipment 110 may be or may include, by way of non-limiting example, any device or appliance that e.g. provides storage, network, or/and computing resource in a network environment. Examples of client equipment include, but are not limited to, a computer, workstation, server, mainframe, virtual machine (whether emulated or on a "bare-metal" hypervisor), container, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data.

In various embodiments, the WWAN router 120 may be or include, by way of non-limiting example, any device that can enable the client equipment 110 within a first network (not shown in FIG. 1), e.g. a LAN, to communicate with devices in another network, e.g. the cellular network 130 and the further network 140, by routing packets between the network of the client equipment 110 and the other networks using one or more communications protocols. In some embodiments, the WWAN router 120 could be an ISR that may integrate multiple network services into a single platform and provide services that previously required additional hardware to run. In this manner, an ISR can be configured to perform functions additional to the traditional routing of packets, such as e.g. support telephony (Voice over IP), video-conferencing, or other kinds of rich media over a WAN, and may include a number of other specialized components such as e.g. Intrusion Prevention.

In various embodiments, the modem 122 may be or include, by way of non-limiting example, any device that can provide, to the client equipment 110, wireless access to the further network 140 (e.g. the Internet) via the cellular network 130. By connecting the modem 122 to the router 120 (as illustrated in FIG. 1 with the modem 122 being shown inside the router 120), instead of e.g. directly to the client equipment 110, all devices connected to the router 120 (i.e., multiple instances of the client equipment 110 in the LAN of the router 120) can access the modem 122, and therefore, the Internet. Of course in other embodiments, the system 100 could include only the modem 122, without the router 120, in which case descriptions provided herein with respect to stabilizing WWAN interface are still applicable for stabilizing the interface of the modem 122.

As previously described herein, WWAN typically uses mobile telecommunication cellular network technologies to transfer data. This is illustrated in FIG. 1 with the cellular network 130 which, according to various embodiments of the present disclosure, could include any cellular network, preferably 3GPP, such as e.g. LTE, UMTS, or GSM. As such, the cellular network 130 includes elements and components for enabling communication over cellular connections. These elements and components are not shown in FIG. 1 in order to not clutter the drawing and because in various cellular technologies these elements and components may differ, but some non-limiting examples of such elements and components are provided below.

For example, when the cellular network 130 is an LTE network, the network 130 may include components such as one or more of eNodeBs (eNBs) radio access points, security gateways (SeGWs), a Radio Access Network (RAN) Management System (RMS), a Mobility Management Entity (MME), a serving gateway (SGW), a Packet Data Network (PDN) gateway (PGW), etc. Such an LTE network could also, optionally, include one or more small cell radio access points, such as Home eNode Bs (HeNBs) (and one or more corresponding HeNB gateways), that can operate in a licensed spectrum to connect user equipment to the network, often using broadband connections. For a mobile operator, small cell radio access points can offer improvements to both coverage and capacity, which is particularly applicable to indoor networking environments where macro cell networks typically suffer coverage limitations. Small cell radio access points can also offer an alternative networking architecture to enable scalability challenges to be addressed.

In another example, when the cellular network 130 is an UMTS network, the network 130 may include components such as one or more of Home Node B's (HNBs) radio access points, HNB gateways, NodeB/Radio Network Controllers (NodeB/RNCs), Mobile Switching Centers (MSCs), serving General Packet Radio Service (GPRS) support nodes (SGSNs), and gateway GPRS support nodes (GGSNs).

The further network 140 illustrated in FIG. 1 would typically include any network capable of broadband data transmission (i.e. wide bandwidth data transmission capable to simultaneously transport multiple signals and traffic types) over connections other than those of the cellular network, i.e. via e.g. coaxial cable, twisted pair, optical fiber, etc.

As used herein, "data" refers to any type of numeric, voice, video, media, or script data, or any type of source or object code, or any other suitable information in any appropriate format that may be communicated from one point to another.

Each of the elements of FIG. 1 may couple to one another through simple interfaces (as illustrated) or through any other suitable connection (wired or wireless, unless specifically prescribed herein to be of a certain type), which provides a viable pathway for network communications. For example, communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

Additionally, any one or more of the elements of FIG. 1 may be combined or removed from the architecture based on particular configuration needs. For example, as described above, the client equipment 110 may be connected directly to the modem 122 without involvement or presence of the WWAN router 120. In another example, the cellular network 130 and the further network 140 may be viewed as a single network providing mobile broadband connections to the client equipment 110, via the modem 122.

As previously described herein, modems providing WWAN connectivity, such as the modem 122, especially when operating with 4G cellular networks such as e.g. LTE, may experience malfunctioning, making the WWAN interface provided by such modems unstable. In case of such malfunctioning of the WWAN interface, certain remedial actions need to be manually performed on the modem to restore connectivity. Since it is not always possible, feasible, or efficient to perform such actions on the modem manually, it is desirable to find methods and systems for stabilizing cellular wireless WAN interface that would decrease or eliminate the need for manual reload of WWAN modems.

Proposed Techniques for Stabilizing Cellular WWAN Interface

Figure 2:
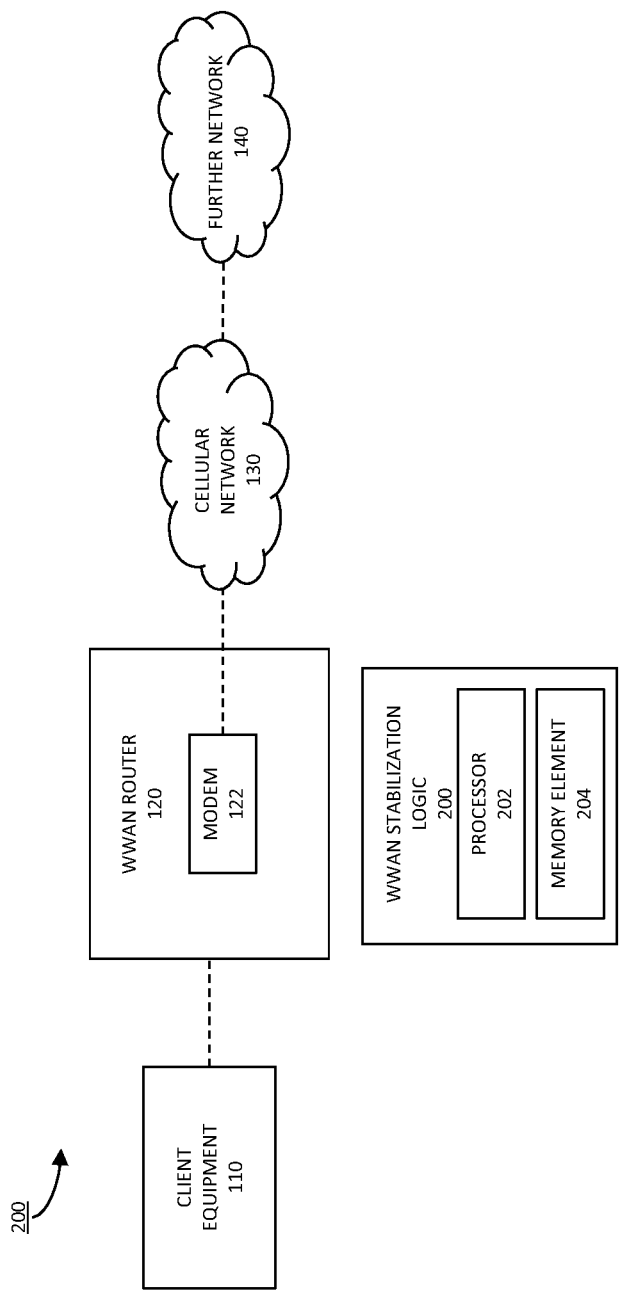
FIG. 2 is a simplified block diagram illustrating an exemplary communication system in a network environment for stabilizing cellular wireless WAN interface of a modem configured to attach to at least one cellular network, according to some embodiments of the present disclosure.

In accordance with one embodiment, a communication system 200 illustrated in FIG. 2 can overcome the aforementioned shortcomings (and others) by implementing a method based on identifying and checking the values of certain key variables associated with a WWAN modem and making a decision to perform certain remedial actions on the modem based on the values of these variables. Embodiments of the present disclosure are based on recognition that identifying the key variables indicative of a health state of a WWAN modem and checking their values allows identifying potential anomalies in the operation of a modem which may e.g. indicate that the modem is likely to fail. In turn, timely identifying potentially anomalous behavior not only allows remedying the situation quicker, possibly avoiding a real or a major failure, but also allows performing remedial actions on the modem that do not require manual intervention, thus reducing or eliminating the need for manual intervention to e.g. reload the modem and improving stability of the modem. As a result, it may be feasible and efficient to implement such a modem as a primary WWAN link (as opposed to only using the modem as a backup WWAN link).

FIG. 2 is a simplified block diagram illustrating an exemplary communication system 200 for stabilizing cellular wireless WAN interface of the modem 122 configured to attach to at least one cellular network 130, according to some embodiments of the present disclosure. The communication system 200 is similar to the communication system 100 illustrated in FIG. 1 and, therefore, the description of the system provided with reference to FIG. 1 is applicable here and is not repeated. In addition, the communication system 200 further includes a WWAN stabilization logic 200. Although not shown in FIG. 2, in some embodiments, various repositories may be associated with the WWAN stabilization logic 200, for example including, but not limited to, databases storing one or more sets of criteria to be used by the WWAN stabilization logic 200 making decisions to perform certain actions on the modem 122, databases storing one or more comparison threshold values to be used by the WWAN stabilization logic 200 in making these decisions, or/and databases storing historical data containing previously recorded values for the certain key variables indicative of the health state of the modem 122.

In regards to the internal structure associated with communication system 200, WWAN stabilization logic 200 may include at least one processor 202 and at least one memory element 204, along with any other suitable hardware and/or software to enable its intended functionality of stabilizing the WWAN interface of the modem 122, as described herein. Similarly, the client equipment 110 and/or the WWAN router 120 may also include memory elements for storing information to be used in achieving the WWAN interface stabilization operations as outlined herein, as well as a processor that can execute software or an algorithm to perform at least parts of the WWAN interface operations as discussed in this Specification. Any of these devices may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term "memory element." The information being tracked or sent to the WWAN stabilization logic 200; the client equipment 110, or the WWAN router 120 could be provided in any database, register, control list, cache, or storage structure: all of which can be referenced at any suitable timeframe. Any such storage options may be included within the broad term "memory element" as used herein. Similarly, any of the potential processing elements, modules, and machines described herein should be construed as being encompassed within the broad term "processor." Each of the network elements and client equipment can also include suitable interfaces for receiving, transmitting, and/or otherwise communicating data or information in a network environment.

Even though the WWAN stabilization logic 200 is illustrated as a separate network element in the networks illustrated in FIG. 2, the WWAN stabilization logic 200 may be implemented as or in any other network element of FIG. 2, e.g. in the modem 122 or in the WWAN router 120, or distributed over a number of network elements shown in FIG. 2.

In one example implementation, the modem 122, the WWAN router 120, and the WWAN stabilization logic 200 are network elements, which are meant to encompass, as applicable, network appliances, servers, routers, switches, gateways, bridges, loadbalancers, firewalls, processors, modules, or any other suitable device, component, element, or object operable to exchange information that facilitates or otherwise helps to provide WWAN interface stabilization. In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

Note that in certain example implementations, the WWAN interface stabilization mechanisms/functions as outlined herein may be implemented by logic encoded in one or more tangible media, which may be inclusive of non-transitory media (e.g., embedded logic provided in an ASIC, in DSP instructions, software [potentially inclusive of object code and source code] to be executed by a processor, or other similar machine, etc.). In some of these instances, memory elements, such as e.g. the memory element 204 shown in FIG. 2, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 202 shown in FIG. 2, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 3:
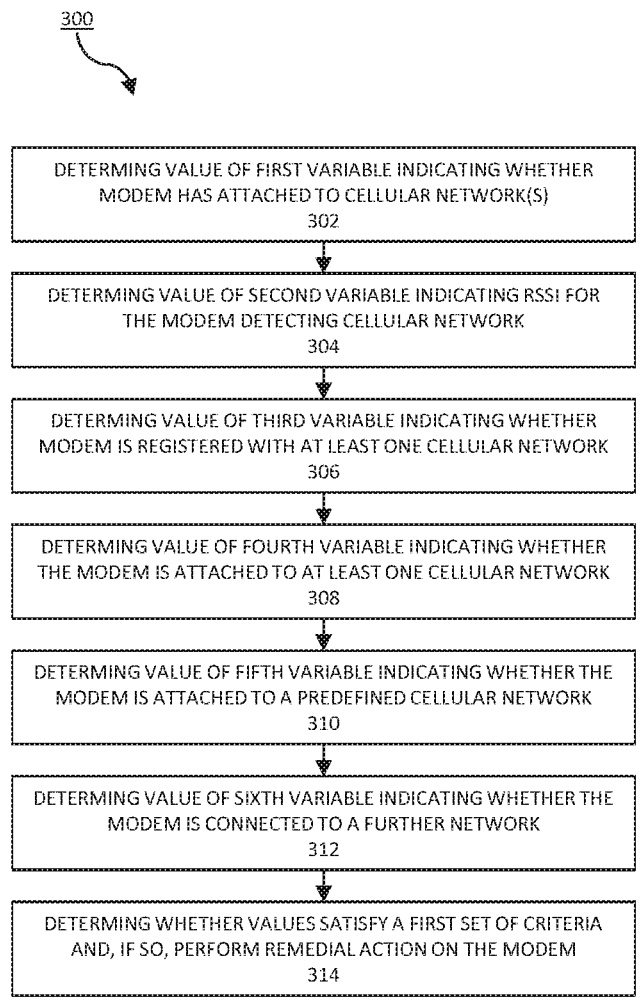
FIG. 3 is a simplified flow diagram illustrating example operations associated with stabilizing cellular wireless WAN interface of a modem, according to some embodiments of the present disclosure.

FIG. 3 provides a simplified flow diagram 300 illustrating example operations associated with stabilizing cellular wireless WAN interface of a modem, according to some embodiments of the present disclosure. Operations of FIG. 3 may be described with reference to the communication system 200 shown in FIG. 2. Of course, any system configured to perform operations illustrated in FIG. 3, in any order, is within the scope of the present disclosure.

The method 300 may begin in step 302, where the WWAN stabilization logic 200 may determine a value of a first variable ("modem_first_attach") indicating whether the modem has attached to the at least one cellular network, e.g. whether the modem has ever attached to the cellular network or whether the modem has attached to the cellular network within a certain period of time in the past. In some embodiments, this variable may be configured to be either 0 or 1 (or any other symbols or take on any other specified values), where the variable will be e.g. set to 1 if the modem 122 has attached at least once to any cellular network, and to 0 otherwise. Such a variable allows accounting for cases of unnecessary action taken in situations where/when there is no cellular coverage. In other embodiments, the first variable may, optionally, also indicate a number of attachments of the modem 122 to at least one cellular network 130.

In step 304, the WWAN stabilization logic 200 may determine a value of a second variable ("modem_rssi") indicating an RSSI for the modem 122 detecting at least one cellular network 130. In some embodiments, this variable may be configured to be either 0 or 1 (or any other symbols or take on any other specified values), where the variable will be e.g. set to 1 if the RSSI value at or below a specified threshold, e.g. −125, indicating that the modem 122 is unable to detect any cellular network, and to 0 otherwise.

In step 306, the WWAN stabilization logic 200 may determine a value of a third variable ("emm_state", where "EMM" stands for "Enhanced Mobility Management") indicating whether the modem 122 is registered with at least one cellular network 130. In some embodiments, this variable may be configured to be either 0 or 1 (or any other symbols or take on any other specified values), where the variable will be e.g. set to 1 if the modem 122 is registered, and to 0 otherwise.

In step 308, the WWAN stabilization logic 200 may determine a value of a fourth variable ("ps_state", where "PS" stands for "Packet Switched") indicating whether the modem 122 is attached to the at least one cellular network 130. In some embodiments, this variable may be configured to be either 0 or 1 (or any other symbols or take on any other specified values), where the variable will be e.g. set to 1 if the modem 122 is attached to the cellular network 130, and to 0 otherwise.

In step 310, the WWAN stabilization logic 200 may determine a value of a fifth variable ("system_mode") indicating whether the modem 122 is attached to at least one cellular network 130 of a predefined radio access technology, e.g. to an LTE network. Again, in some embodiments, this variable may be configured to be either 0 or 1 (or any other symbols or take on any other specified values), where the variable will be e.g. set to 1 if the modem 122 is on the cellular network of that predefined technology, and to 0 otherwise.

In step 312, the WWAN stabilization logic 200 may determine a value of a sixth variable ("mode") indicating whether the modem 122 is connected, via at least one cellular network 130, to the further network 140 (i.e., determining whether the modem 122 is online or offline). In some embodiments, this variable may be configured to be either 0 or 1 (or any other symbols or take on any other specified values), where the variable will be e.g. set to 1 if the modem 122 is online, and to 0 otherwise.

After the WWAN stabilization logic 200 has collected determined values for the six variables described above (not necessarily in the order illustrated in FIG. 3), in step 314, the WWAN stabilization logic 200 may be configured to assess whether the determined values satisfy a predefined first set of one or more criteria and, upon positive determination, perform a predefined first remedial action on the modem 122. In various embodiments, the WWAN stabilization logic 200 may be configured to assess whether the determined values satisfy further predefined sets of one or more criteria and take other predefined remedial actions on the modem 122 in accordance with the assessment. For example, the WWAN stabilization logic 200 may be configured to temporarily disrupt provision of power to the modem 122 (and subsequently restore the provision of power), when the analyzed values of the variables satisfy one set of one or more criteria and to reset the modem 122 (e.g. by a software modem reset which causes spawning of all of the necessary processed on the modem) when the analyzed values of the variables satisfy another set of one or more criteria.

While FIG. 3 illustrates determination of the values of six variables prior to the WWAN stabilization logic 200 taking a decision on whether and which remedial action is to be performed on the modem 122, in other embodiments, more variables, less variables, and/or other variables may be evaluated and compared against one or more predefined sets of criteria. Any system metrics, or a particular combination of the system metrics, that may indicate impending failure of a WWAN modem 122 based on thresholds, ranges, or any other suitable measures, are within the scope of the present disclosure.

Some of the other variables that may be used by the WWAN stabilization logic 200 in taking a decision on whether and which remedial action to perform on the modem 122 are described below.

A variable check_counter may be configured to indicate the number of times the WWAN stabilization logic 200 checked for the anomalous behavior of the modem 122 before taking any remedial actions. The initial value of the counter may be provided e.g. by a user upon installation of the modem 122 or the WWAN stabilization logic 200. For example, the initial value of this variable may indicate that the WWAN stabilization logic 200 needs to determine the values of the variables needed to make the decision and to come up with the same decision 6 times prior to actually taking the remedial action on the modem 122. Such implementation may advantageously prevent false positives on reporting anomalous behavior of the modem. In some embodiments, timing between the subsequent checks by the WWAN stabilization logic 200 (i.e. the timing between subsequent determinations of values of the specified key variables) may also be pre-defined, e.g. configuring the WWAN stabilization logic 200 to determine the values every 10 seconds. A person of ordinary skill in the art will recognize that, in other embodiments, this timing may be defined in other terms, as e.g. triggered by an event, all of which definitions are within the scope of the present disclosure.

Some additional variables may define a level of urgency with which the recovery actions need to be taken, meaning that the recovery may be delayed, depending on the values of these variables. One such variable may be referred to as "modem_primary_interface" to convey that the variable is used to indicate to the WWAN stabilization logic 120 whether, in a particular deployment scenario, the modem 122 is configured to be a primary WWAN interface or a backup WWAN interface. In some embodiments, this variable may be configured to be either 0 or 1 (or any other symbols or take on any other specified values), where the variable will be e.g. set to 1 if the modem 122 is the primary WWAN interface, and to 0 otherwise. Value of this variable may influence the timing of when the WWAN stabilization logic 200 is configured to perform remedial action(s) or/and to determine the values of the key variables necessary for taking the decision on these actions.

Another variable that may be considered to define a level of urgency with which the recovery actions need to be taken may be referred to as "no_downlinkdata_timer" indicating that such a variable may be implemented as a timer value, e.g. measured in seconds and e.g. provided by a user upon installation of the modem 122 or the WWAN stabilization logic 200, where the WWAN stabilization logic 200 is configured to perform modem health check (i.e. determination of the values of the key variables) when the timer expires. Such a timer may be reset every time data is received on the cellular interface, because receiving of such data indicates that the modem 122 is functioning properly.

In various embodiments, some or all of the variables used by the WWAN stabilization logic 200 to make a decision with respect to the remedial action on the modem 122, may be pre-defined (e.g. defined ahead of time, e.g. configured upon installation of the WWAN stabilization logic 200 and/or of the modem 122) or dynamically defined by the WWAN stabilization logic 200 (e.g. depending on the current network conditions).

Example of Functionality of the WWAN Stabilization Logic

As previously described, in various embodiments, more variables, less variables, or different variables than the exemplary variables described above may be used by the WWAN stabilization logic 200 is making a decision on the remedial actions to take on the modem 122. Below, a high-level software logic implementation is provided for one example of how the WWAN stabilization logic 200 may use the variables described above to make such decisions. Of course, in other embodiments, other implementations are possible, all of which are within the scope of the present disclosure.

Figure 4:
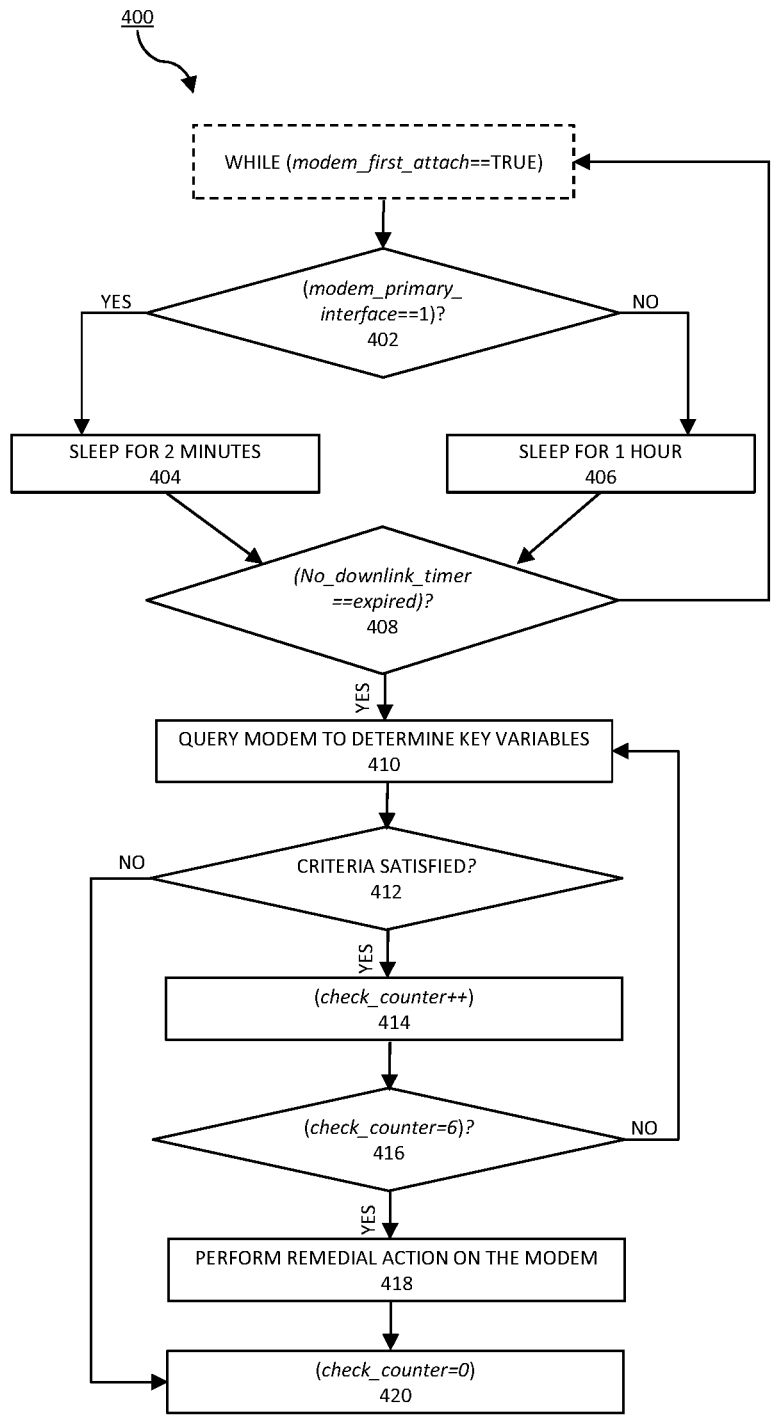
FIG. 4 provides a simplified flow diagram illustrating one example of using certain key variables to stabilize cellular wireless WAN interface of a modem, according to some embodiments of the present disclosure.

FIG. 4 provides a simplified flow diagram 400 illustrating one example of the WWAN stabilization logic 200 using certain key variables to stabilize cellular wireless WAN interface of a modem, according to some embodiments of the present disclosure. Operations of FIG. 4 may be described with reference to the communication system 200 shown in FIG. 2. Of course, any system configured to perform operations illustrated in FIG. 4, in any order, is within the scope of the present disclosure.

As shown with the dashed box on top of FIG. 4, the method 400 may be performed only after the modem 122 has attached at least once to the cellular network 130.

The method 400 may begin in step 402, where the WWAN stabilization logic 200 may determine whether the current value of the variable modem_first_attach indicates that the modem 122 has attached at least once to at least one cellular network 130. If so, then the method proceeds to step 404 where the WWAN stabilization logic 200 waits for a specified time period, in the example of FIG. 4 shown as 2 minutes, before proceeding further. Otherwise, the method proceeds to step 406 where the WWAN stabilization logic 200 waits for another specified time period, in the example of FIG. 4 shown as 1 hour, before proceeding further. Typically the time period of step 406 would be specified to be longer than that of step 404, to ensure that the health check of the modem is performed more frequently (i.e. with less waiting time) when the modem provides the primary cellular interface, as opposed to the modem providing a backup cellular interface.

After the waiting period of either step 404 or step 406 is over, the WWAN stabilization logic 200 may proceed to step 408 where it determines whether the variable No_downlink_timer indicates that the timer has expired. This step is performed to ensure that the WWAN stabilization logic 200 only starts query of the key variables when no data has been received on cellular interface for a specified time interval (specified by the initial value of the variable No_downlink_timer). As previously described herein, this timer may be configured to be reset every time data is received on cellular interface, which means that when the data is received then the timer is not expired and the timer starts counting down the time again, starting from the initial value. Thus, an expired timer indicates that data has not been received for the duration of time that is at least equal to the initial value of the timer. The method may then proceed to step 410, where the WWAN stabilization logic 200 may query the modem to determine the values of the [rest of the] variables identified as the key variables. Once the values are obtained, the WWAN stabilization logic 200 may proceed to start evaluating the values in order to make a decision on the health state of the modem by checking the values against a certain set of criteria. This is illustrated with steps 412-416 in FIG. 4.

In step 412, the WWAN stabilization logic 200 may determine whether a certain specified set of criteria is satisfied. Such a set of criteria may e.g. be as follows:
(check_counter<6;modem_rssi==−125∥((ps_state==Not Attached && emm_state==Registered)∥ (ps_state==Attached && emm_state==Registered))

If so, then the method proceeds to step 414 where the WWAN stabilization logic 200 may increment the variable check_counter (assuming that at the beginning of the method 400 the value of this variable was set to the initial value, e.g. to 0). In step 416, the WWAN stabilization logic 200 may determine whether the variable check_counter has reached a certain specified threshold value, shown in FIG. 4 as value of 6 indicating that the criteria of step 412 has been found to be satisfied 6 times in a row. If so, then the method proceeds to step 418 where the WWAN stabilization logic 200 may perform a specified remedial action on the modem 122, e.g. power cycle the modem and, in step 420, reset the variable check_counter. If, in step 416 the determination is negative, the method proceeds to step 410 where the WWAN stabilization logic 200 may query the modem again.

If, in step 412, the WWAN stabilization logic 200 determines that the criteria are not satisfied, the method may also proceed to step 420 where the WWAN stabilization logic 200 may reset the variable check_counter.

A person of ordinary skill in the art will immediately recognize that an illustration of FIG. 4 provides but one of many possibilities of performing a health check of a modem. In particular, the details of timing of the operations, of what the WWAN stabilization logic 200 may be configured do during the waiting times of steps 404 and 406 (e.g. sleep or perform some other operations), of the implementation of the counters and timers, and so on, may vary greatly in different embodiments, all of which are within the scope of the present disclosure.

VARIATIONS AND IMPLEMENTATIONS

It is important to note that the steps in the appended diagrams 300 and 400 illustrate only some of the possible scenarios and patterns that may be executed by, or within, the communication system 200. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding example operations and use cases have been offered for purposes of example and discussion. Substantial flexibility is provided by the communication system 200 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A computer-implemented method for controlling a wireless wide area network (WWAN) modem configured to attach to at least one cellular network, the method comprising:
    querying the modem in a plurality of instances, wherein each instance of the plurality of instances comprises:
        determining values for a plurality of variables that describe an operational state of the modem relative to the at least one cellular network; and
        incrementing a counter responsive to determining that the determined values satisfy a predefined first set of criteria, wherein satisfying the predefined first set of criteria indicates an impending failure of the modem; and
    responsive to the value of the counter reaching a predefined number of instances that is greater than one, automatically performing a first action on the modem that comprises temporarily disrupting provision of power to the modem.

2. The method according to claim 1, further comprising: performing a second action on the modem when the values satisfy a predefined second set of criteria, the second action comprising resetting the modem.

3. The method according to claim 1, further comprising: receiving, via user input, the predefined number of instances.

4. The method according to claim 1, further comprising: determining a value of a variable indicating whether the modem is configured to operate as a primary WWAN interface; and controlling a timing of automatically performing the first action based on the value.

5. The method according to claim 1, wherein
determining the values for the plurality of variables is responsive to an expiration of a timer, and
wherein the timer is configured to reset responsive to the modem receiving data from the at least one cellular network.

6. One or more non-transitory computer-readable storage media encoded with software comprising computer-executable instructions and, when the software is executed, operable to perform a method for controlling a wireless wide area network (WWAN) modem configured to attach to at least one cellular network, the method comprising:
querying the modem in a plurality of instances, wherein each instance of the plurality of instances comprises:
determining values for a plurality of variables that describe an operation state of the modem relative to the at least one cellular network; and
incrementing a counter responsive to determining that the determined values satisfy a predefined first set of criteria, wherein satisfying the predefined first set of criteria indicates an impending failure of the modem; and
responsive to the value of the counter reaching a predefined number of instances that is greater than one, automatically performing a first action on the modem that comprises temporarily disrupting provision of power to the modem.

7. The one or more non-transitory computer-readable storage media according to claim 6, wherein the method further comprises:
performing a second action on the modem when the values satisfy a predefined second set of criteria, the second action comprising resetting the modem.

8. The one or more non-transitory computer-readable storage media according to claim 6, wherein the method further comprises:
receiving, via user input, the predefined number of instances.

9. The one or more non-transitory computer-readable storage media according to claim 6, wherein the method further comprises:
determining a value of a variable indicating whether the modem is configured to operate as a primary WWAN interface; and
controlling a timing of automatically performing the first action based on the value.

10. The one or more non-transitory computer-readable storage media according to claim 6, wherein determining the values for the plurality of variables is responsive to an expiration of a timer.

11. The one or more non-transitory computer-readable storage media according to claim 10, wherein the timer is configured to reset responsive to the modem receiving data from the at least one cellular network.

12. A system for controlling a wireless wide area network (WWAN) modem configured to attach to at least one cellular network, the system comprising:
at least one memory configured to store computer-executable instructions; and
at least one processor coupled to the at least one memory and configured, when executing the computer-executable instructions, to:
querying the modem in a plurality of instances, wherein each instance of the plurality of instances comprises:
determine values for a plurality of variables that describe an operational state of the modem relative to the at least one cellular network; and
increment a counter responsive to determining that the determined values satisfy a predefined first set of criteria, wherein satisfying the predefined first set of criteria indicates an impending failure of the modem; and
responsive to the value of the counter reaching a predefined number of instances that is greater than one, automatically perform a first action on the modem that comprises temporarily disrupting provision of power to the modem.

13. The system according to claim 12, wherein the at least one processor is further configured to:
perform a second action on the modem when the values satisfy a predefined second set of criteria, the second action comprising resetting the modem.

14. The system according to claim 12, wherein the at least one processor is further configured to:
determine a value of a variable indicating whether the modem is configured to operate as a primary WWAN interface; and
control a timing of automatically performing the first action based on the value.

15. The system according to claim 12, wherein determining the values for the plurality of variables is responsive to an expiration of a timer.

16. The system according to claim 15, wherein the timer is configured to reset responsive to the modem receiving data from the at least one cellular network.

17. The system according to claim 12, further comprising a router and the modem.

18. The method according to claim 1, wherein determining the values for the plurality of variables comprises:
determining values of one or more variables indicative of a connection of the modem to the at least one cellular network; and
determining a value of a variable indicating a received signal strength indication (RSSI) for the modem detecting the at least one cellular network.

19. The method according to claim 1, wherein determining the values for the plurality of variables comprises:
determining a value of a first variable indicating whether the modem has attached to the at least one cellular network;
determining a value of a second variable indicating a received signal strength indication (RSSI) for the modem detecting the at least one cellular network;
determining a value of a third variable indicating whether the modem is registered with the at least one cellular network;
determining a value of a fourth variable indicating whether the modem is attached to the at least one cellular network;
determining a value of a fifth variable indicating whether the modem is attached to the at least one cellular network of a predefined technology; and
determining a value of a sixth variable indicating whether the modem is connected via the at least one cellular network to a further network.

20. The method according to claim 1, wherein automatically performing the first action on the modem is performed responsive to determining that the predefined number of instances are consecutive instances.

21. The method according to claim 1, wherein determining the values in each instance is performed according to a predefined timing.

* * * * *